United States Patent [19]
Willard, Jr.

[11] Patent Number: 6,016,015
[45] Date of Patent: Jan. 18, 2000

[54] SOLAR-WIND TURBINE

[76] Inventor: Bruce L. Willard, Jr., P.O. Box 11, Bonanza, Oreg. 97623

[21] Appl. No.: 08/924,674

[22] Filed: Sep. 5, 1997

[51] Int. Cl.[7] .................................. F03D 9/00; F03G 6/00
[52] U.S. Cl. ................................................ 290/55; 290/54
[58] Field of Search ........................... 290/1 A, 43, 44, 290/54, 55; 60/641.11; 415/4.2

[56] References Cited

U.S. PATENT DOCUMENTS

| | | | |
|---|---|---|---|
| 3,936,652 | 2/1976 | Levine | 290/2 |
| 4,070,131 | 1/1978 | Yen | 415/3 |
| 4,379,972 | 4/1983 | Sosa et al. | 290/44 |
| 4,433,544 | 2/1984 | Wells et al. | 60/641.12 |
| 4,452,046 | 6/1984 | Valentin | 60/641.11 |
| 4,508,973 | 4/1985 | Payne | 290/55 |
| 4,551,631 | 11/1985 | Trigilio | 290/55 |
| 4,779,006 | 10/1988 | Wortham | 290/55 |
| 5,075,564 | 12/1991 | Hickey | 290/55 |
| 5,103,646 | 4/1992 | Fini | 60/698 |
| 5,381,048 | 1/1995 | Baird | 290/55 |
| 5,394,016 | 2/1995 | Hickey | 290/55 |

*Primary Examiner*—Nicholas Ponomarenko

[57] ABSTRACT

A solar-wind turbine is provided including a base with a hollow vertically oriented orientation. A plurality of vertically oriented stanchions are each connected to a bottom surface of the base and depend downwardly therefrom for elevating an open bottom of the base above the ground to allow air to flow therein. A turbine assembly including a propeller is situated above the base and is rotatable with respect thereto. A generator assembly includes a stator fixedly coupled with respect to the base and a rotor fixed with respect to the propeller. During use, an air current is generated through the base thereby effecting the rotation of the propeller and the rotor with respect to the stator to generate power.

8 Claims, 2 Drawing Sheets

SOLAR-WIND TURBINE

BACKGROUND OF THE INVENTION

1. Field of the Invention

The present invention relates to turbines and more particularly pertains to a new solar-wind turbine for generating power for various purposes including pumping water for livestock.

2. Description of the Prior Art

The use of turbines is known in the prior art. More specifically, turbines heretofore devised and utilized are known to consist basically of familiar, expected and obvious structural configurations, notwithstanding the myriad of designs encompassed by the crowded prior art which have been developed for the fulfillment of countless objectives and requirements.

Known prior art turbines include U.S. Pat. No. 5,394,016; U.S. Pat. No. 5,103,646; U.S. Pat. No. 5,075,564; U.S. Pat. No. 4,551,631; and U.S. Pat. No. 4,433,544.

In these respects, the solar-wind turbine according to the present invention substantially departs from the conventional concepts and designs of the prior art, and in so doing provides an apparatus primarily developed for the purpose of generating power for various purposes including pumping water for livestock.

SUMMARY OF THE INVENTION

In view of the foregoing disadvantages inherent in the known types of turbines now present in the prior art, the present invention provides a new solar-wind turbine construction wherein the same can be utilized for generating power for various purposes including pumping water for livestock.

The general purpose of the present invention, which will be described subsequently in greater detail, is to provide a new solar-wind turbine apparatus and method which has many of the advantages of the turbines mentioned heretofore and many novel features that result in a new solar-wind turbine which is not anticipated, rendered obvious, suggested, or even implied by any of the prior art turbines, either alone or in any combination thereof.

To attain this, the present invention generally comprises a base with an outer shell constructed from a transparent material, such as glass. The outer shell is constructed to include an upper extent with a hollow cylindrical configuration and a lower extent with an inverted frusto-conical configuration integrally coupled in coaxial relationship with the upper extent. The base further includes an inverted horn-shaped inner shell with an arcuate tapering periphery formed of a dark colored heat conductive material. A helix is formed in an interior space of the inner shell. The inner shell is coupled within the outer shell via a plurality of connection rods with a space situated therebetween. As shown in FIG. 1, a plurality of vertically oriented stanchions are each connected to a bottom surface of the outer shell and depend downwardly therefrom. The stanchions function to elevate an open bottom of the of the inner shell above the ground to allow air to flow therein. As best shown in FIGS. 1 & 3–4, a turbine assembly is provided including a disk-shaped housing with a circular tope face having a circular bore centrally formed therein. A periphery depends from the tope face for defining an open bottom. As best shown in FIG. 3, the periphery of the disk-shaped housing is rotatably coupled to an open top of the inner shell of the base via a plurality of bearings. The periphery further has a tapered outlet formed therein, as shown in FIGS. 1 & 4. Such tapered outlet extends radially outward from the disk-shaped housing. The turbine outlet further includes a propeller situated within the disk-shaped housing. The propeller is equipped with a hollow vertically oriented tubular shaft rotatably situated through the circular bore of the disk-shaped housing and extended upwardly therefrom. Finally, a generator assembly is included with an inverted T-shaped support. As shown in FIG. 3, the support is defined by a thin horizontal member fixedly coupled within the interior space of the inner shell and a vertical member rotatably situated through the hollow shaft of the propeller. A stator is fixedly coupled with respect to the vertical member of the support of the generator assembly for maintaining the stator fixed with respect to the base. Further, a rotor is fixed with respect to the shaft of the propeller.

There has thus been outlines, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the present invention in detail, it is to be understood that the invention is not limited in it application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciated that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new solar-wind turbine apparatus and method which has many of the advantages of the turbines mentioned heretofore and many novel features that result in a new solar-wind turbine which is not anticipated, rendered obvious, suggested, or even implied by any of the prior art turbines, either alone or in any combination thereof.

It is another object of the present invention to provide a new solar-wind turbine which may be easily and efficiently manufactured and marketed.

It is a further object of the present invention to provide a new solar-wind turbine which is of a durable and reliable construction.

An even further object of the present invention is to provide a new solar-wind turbine which is susceptible of a low cost of manufacture with regard to both materials and labor, and which accordingly is then susceptible of low prices of sale to the consuming public, thereby making such solar-wind turbine economically available to the buying public.

Still yet another object of the present invention is to provide a new solar-wind turbine which provides in the apparatuses and methods of the prior art some of the advantages thereof, while simultaneously overcoming some of the disadvantages normally associated therewith.

Still another object of the present invention is to provide a new solar-wind turbine for generating power for various purposes including pumping water for livestock.

Even still another object of the present invention is to provide a new solar-wind turbine that includes a base with a hollow vertically oriented orientation. A plurality of vertically oriented stanchions are each connected to a bottom surface of the base and depend downwardly therefrom for elevating an open bottom of the base above the ground to allow air to flow therein. A turbine assembly including a propeller is situated above the base and is rotatable with respect thereto. A generator assembly includes a stator fixedly coupled with respect to the base and a rotor fixed with respect to the propeller. During use, an air current is generated through the base thereby effecting the rotation of the propeller and the rotor with respect to the stator to generate power.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
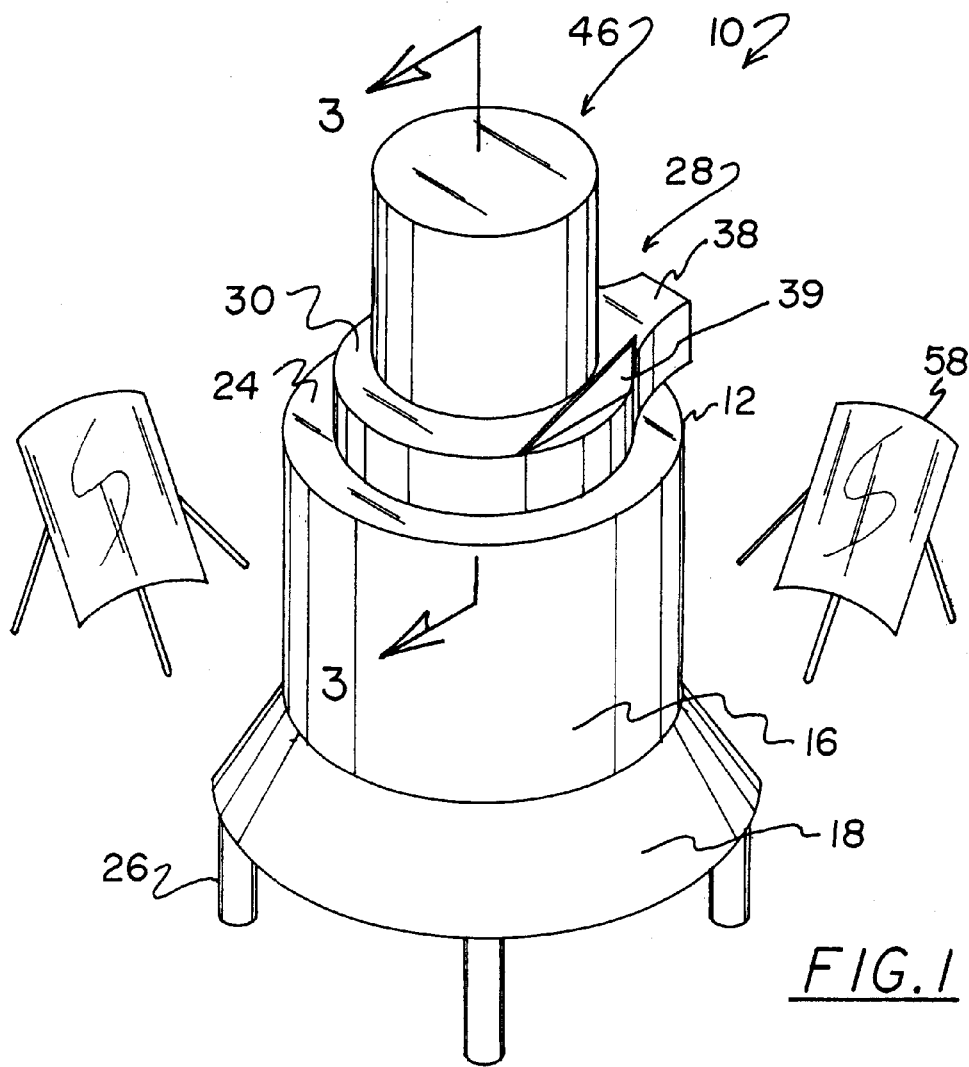
FIG. 1 is a perspective view of a new solar-wind turbine according to the present invention.
Figure 2:
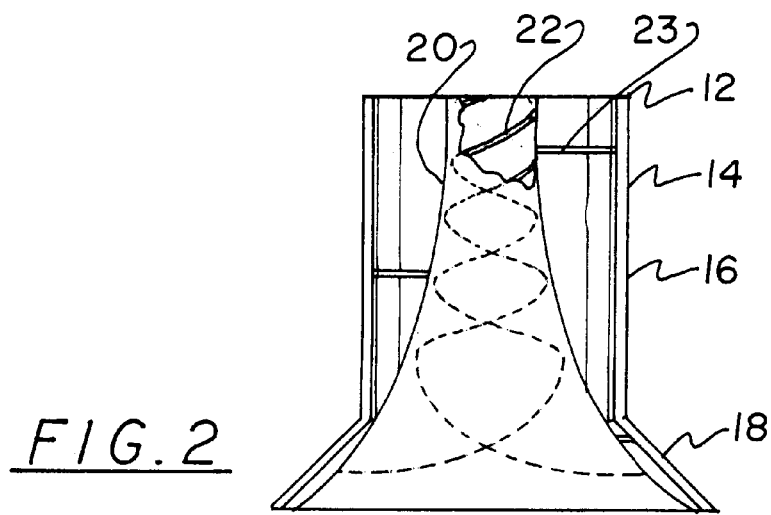
FIG. 2 is a cross-sectional view of the shells of the base of the present invention.

With reference now to the drawings, and in particular to FIGS. 1 through 4 thereof, a new solar-wind turbine embodying the principles and concepts of the present invention and generally designated by the reference numeral 10 will be described.

The present invention, as designated as numeral 10 includes a base 12 with an outer shell 14 constructed from a transparent material, such as glass. The outer shell is constructed to include an upper extent 16 with a hollow cylindrical configuration and a lower extent 18 with an inverted frusto-conical configuration integrally coupled in coaxial relationship with the upper extent.

The base further includes an inverted horn-shaped inner shell 20 with an arcuate tapering periphery formed of a dark colored heat conductive material. A helix 22 is formed in an interior space of the inner shell. The inner shell is coupled within the outer shell via a plurality of connection rods 23 with a space situated therebetween. Preferably, the outer shell has an annular top face 24 for preventing heated air from escaping from the space.

As shown in FIG. 1, a plurality of vertically oriented stanchions 26 are each connected to a bottom surface of the outer shell and depend downwardly therefrom. The stanchions function to elevate an open bottom of the of the inner shell above the ground to allow air to flow therein.

Figure 3:
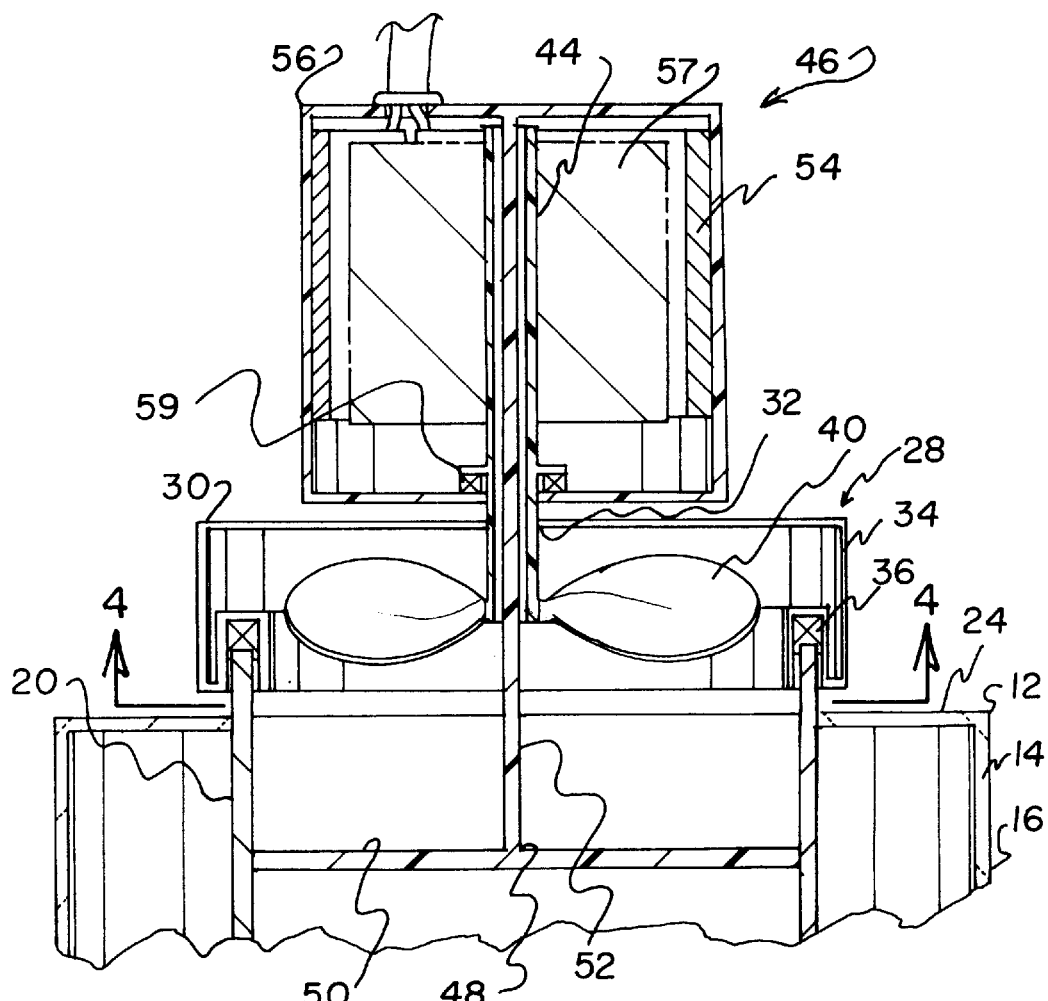
FIG. 3 is a cross-sectional view of the present invention taken along line 3—3 shown in FIG. 1.
Figure 4:
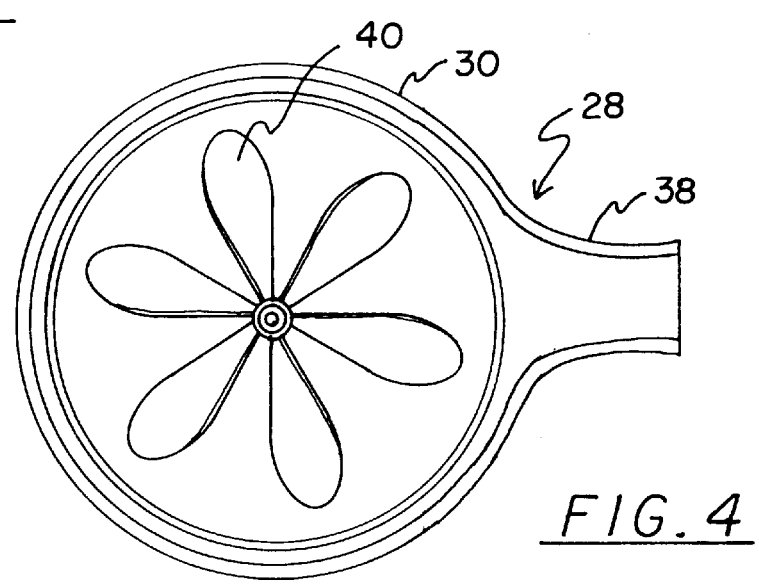
FIG. 4 is a cross-sectional view of the turbine assembly of the present invention taken along line 4—4 shown in FIG. 3.

As best shown in FIGS. 1 & 3–4, a turbine assembly 28 is provided including a disk-shaped housing 30 with a circular top face having a circular bore 32 centrally formed therein. A periphery 34 depends from the top face for defining an open bottom. As best shown in FIG. 3, the periphery of the disk-shaped housing is rotatably coupled to an open top of the inner shell of the base via a plurality of bearings 36. The periphery further has a tapered outlet 38 formed therein, as shown in FIGS. 1 & 4. Such tapered outlet extends radially outward from the disk-shaped housing within a plan directed in parallel with a direction in which the tapered opening extends.

The turbine assembly further includes a propeller 40 situated within the disk-shaped housing. The propeller is equipped with a hollow vertically oriented tubular shaft 44 rotatably situated through the circular bore of the disk-shaped housing and extended upwardly therefrom.

Finally, a generator assembly 46 is included with an inverted T-shaped support 48. As shown in FIG. 3, the support is defined by a thin horizontal member 50 fixedly coupled within the interior space of the inner shell above the helix. The support is further defined by a vertical member 52 fixedly coupled to the horizontal member and in rotatable communication within the hollow shaft of the propeller. A stator 54 is fixedly coupled with respect to the vertical member of the support of the generator assembly for maintaining the stator fixed with respect to the base.

Such relationship between the stator and T-shaped support is afforded by means of a cylindrical housing 56 with a bore formed on a bottom circular face thereof for allowing the passage of the rotatable shaft and the vertical member 52 therethrough. The vertical member of the support extends upwardly and is integrally coupled to a top circular face of the cylindrical housing. The stator is situated within an interior of the cylindrical housing. A rotor 57 is fixed with respect to the tubular shaft of the propeller and is adapted to rotate with respect to the stator. To afford a smooth rotational coupling between the tubular shaft and the cylindrical housing, a bearing assembly 59 is situated therebetween. It should be noted that such bearing assembly 59 further serves to maintain the elevated position of the cylindrical housing with respect to the disk-shaped housing of the generator housing.

In use, an air current is generated through the helix of the base from the open bottom of the inner shell to the tapered outlet of the disk-shaped housing of the turbine assembly by the heating of the air therein. Such air current effects the rotation of the propeller and the rotor with respect to the stator to generate power. Also during use, the disk-shaped housing of the turbine assembly is adapted to rotate such that the tapered outlet is aligned in the direction of the wind. As an option, a plurality of arcuate mirrors 58 mounted on tripods may be utilized to direct sun light on the base for optimizing the operation of the present invention.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A solar-wind turbine system comprising, in combination:

a base including an outer shell constructed from a transparent material, the outer shell including an upper extent with a hollow cylindrical configuration and a lower extent, the outer shell including a lower extent having an inverted frusto-conical configuration integrally coupled in coaxial relationship with the upper extent, the base further including an inverted horn-shaped inner shell with an arcuate tapering periphery formed of a dark colored heat conductive material, the inner shell defining a substantially vertical air path through the base, the inner shell having a lower air entry opening and an upper air exit opening, the lower air entry opening and the upper air exit opening being oriented in substantially parallel horizontal planes, the lower air entry opening forming a substantially circular mouth for receiving air from below the inner shell, the inner shell having a helix formed in an interior space thereof for imparting a helical flow pattern to air flowing through the inner shell, the inner shell being coupled to the outer shell by a plurality of connection rods wherein a space is formed between the inner shell and outer shell for trapping therebetween air heated by sunlight shining through the transparent outer shell;

a plurality of vertically oriented stanchions, each of the stanchions being connected to a bottom surface of the outer shell for supporting the outer shell on a ground surface, each of the stanchions depending downwardly from the outer shell for elevating the lower air entry opening of the inner shell above the ground surface in a spaced relationship with the ground surface to permit air to flow between the inner shell and the ground surface such that heated air may rise into the air path through the lower air entry opening;

a propeller assembly including a disk-shaped housing with a circular top face, the tope face having a circular bore centrally formed therein, the tope face having a periphery depending therefrom and defining an open bottom, the periphery of the disk-shaped housing being rotatably coupled to an open top of the inner shell of the base, the periphery having a tapered outlet formed therein, the periphery extending radially outward therefrom, the propeller assembly including a propeller situated in the disk-shaped housing, the propeller assembly including a hollow vertically oriented tubular shaft rotatably situated through the circular bore of the disk-shaped housing, the tubular shaft extending upwardly from the propeller;

a generator assembly including an inverted T-shaped support, the T-shaped support including a thin horizontal member fixedly coupled in the interior space of the inner shell, the T-shaped support including a vertical member rotatably situated through the hollow shaft of the propeller, a stator coupled to the vertical member of the support of the generator assembly in a manner adapted for maintaining the stator in a fixed orientation with respect to the base, and a rotor fixed with respect to the shaft of the propeller;

a plurality of mirrors positioned at spaced locations from the base such that the mirrors reflect sun light through the transparent outer shell and onto the dark inner shell for heating the air in the inner shell to cause heated air to rise through the inner shell;

whereby an air current is generated through the helix of the base from the lower air entry opening of the inner shell to the tapered outlet of the disk-shaped housing of the turbine assembly thereby effecting the rotation of the propeller and the rotor with respect to the stator to generate power, the disk-shaped housing of the turbine assembly being adapted to rotate such that the tapered outlet is aligned in the direction of the wind.

2. A solar-wind turbine system comprising:

a base with a hollow vertically oriented orientation defining a substantially vertical air path, the base having a lower air entry opening into the air path, the lower air entry opening lying in a substantially horizontal plane, the lower air entry opening forming a substantially circular mouth for receiving air from below the base;

a plurality of vertically oriented stanchions, each of the stanchions being connected to a bottom surface of the base for supporting the outer shell on a ground surface, each of the stanchions depending downwardly from the base for elevating the lower air entry opening of the base above the ground surface in a spaced relationship with the ground surface to permit air to flow between the lower air entry opening and the base such that heated air may rise into the air path through the lower air entry opening;

a propeller assembly including a propeller situated above the base and rotatable with respect to the base; and a generator assembly including a stator fixed with respect to the base and a rotor fixed with respect to the propeller;

whereby an air current is generated through the air path in the base thereby effecting the rotation of the propeller and the rotor with respect to the stator to generate power;

wherein the base includes an inverted horn-shaped inner shell formed of a dark colored heat conductive material;

a plurality of mirrors positioned at spaced locations from the base such that the mirrors reflect sun light through the transparent outer shell and onto the dark inner shell for heating the air in the inner shell to cause heated air to rise through the inner shell.

3. A solar-wind turbine system as set forth in claim 2 wherein the propeller resides within a housing rotatably coupled to the base, the housing having a radially formed outlet.

4. A solar-wind turbine system as set forth in claim 2 wherein the stator and rotor are situated above the propeller.

5. A solar-wind turbine system as set forth in claim 2 wherein the inner shell has a helix formed in an interior space thereof.

6. A solar-wind turbine system as set forth in claim 2 wherein the base includes an outer shell constructed from a transparent material is situated exterior of the inverted horn-shaped inner shell.

7. A solar-wind turbine system as set forth in claim 6 wherein the inner shell is coupled within the outer shell via a plurality of connection rods wherein a space is formed between the inner shell and outer shell for trapping therebetween air heated by the sunlight shining through the transparent outer shell.

8. A solar-wind turbine system as set forth in claim 2 additionally comprising an inner shell defining a substantially vertical air path through the base, the inner shell having the lower air entry opening therein and having an upper air exit opening, the lower air entry opening and the upper air exit opening being oriented in substantially parallel horizontal planes.

* * * * *